(12) United States Patent
Eletreby et al.

(10) Patent No.: US 11,139,853 B2
(45) Date of Patent: Oct. 5, 2021

(54) LOW-POWER WIDE AREA NETWORKS

(71) Applicant: CARNEGIE MELLON UNIVERSITY, Pittsburgh, PA (US)

(72) Inventors: Rashad Eletreby, Pittsburgh, PA (US); Swarun Kumar, Pittsburgh, PA (US); Osman Yagan, Pittsburgh, PA (US); Diana Zhang, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 17/053,406

(22) PCT Filed: Jul. 3, 2019

(86) PCT No.: PCT/US2019/040470
§ 371 (c)(1),
(2) Date: Nov. 6, 2020

(87) PCT Pub. No.: WO2020/010179
PCT Pub. Date: Jan. 9, 2020

(65) Prior Publication Data
US 2021/0234570 A1 Jul. 29, 2021

Related U.S. Application Data

(63) Continuation of application No. 62/763,876, filed on Jul. 6, 2018.

(51) Int. Cl.
*H04B 1/69* (2011.01)
*H04W 52/02* (2009.01)
(Continued)

(52) U.S. Cl.
CPC .......... *H04B 1/69* (2013.01); *H04L 25/0202* (2013.01); *H04L 27/103* (2013.01);
(Continued)

(58) Field of Classification Search
CPC .............. H04B 1/69; H04B 2001/6912; H04L 25/0202; H04L 27/103; H04L 27/144; H04L 27/265; H04W 52/0209
See application file for complete search history.

(56) References Cited

U.S. PATENT DOCUMENTS

| 2013/0051433 A1 | 2/2013 | Hiscock |
| 2013/0129026 A1 | 5/2013 | Petersen |

(Continued)

OTHER PUBLICATIONS

International Search Report and Written Opinion for International Patent Application No. PCT/US2019/040470 dated Oct. 7, 2019, 15 pages.

(Continued)

*Primary Examiner* — Freshteh N Aghdam
(74) *Attorney, Agent, or Firm* — Kacvinsky Daisak Bluni PLLC (57) ABSTRACT

Described herein is a system that overcomes challenges pertaining to density and range of urban LP-WANs despite the limited capabilities of base station and client hardware. The invention proposes a novel technique that aims to disentangle and decode large numbers of interfering transmissions at a simple, single-antenna LP-WAN base station by exploiting the hardware imperfections of low-cost LP-WAN clients to its advantage Second, the present invention exploits the correlation of sensed data collected by LP-WAN nodes to collaboratively reach a far-away base station, even if individual clients are beyond its range.

20 Claims, 7 Drawing Sheets

```
Algorithm 1 Decoding collisions
─────────────────────────────────────────
PreambleLen = ℓ, SpreadingFactor = SF
SymSize = 2^SF
FFTLen = 10 × SymSize
while SymCount < ℓ do
    DemodSym = Symbols(SymCount) . * DownChirp
    n = NumPeaks(FFT(DemodSym, FFTLen))
    [f̂₁, ..., f̂ₙ] = FindPeaks(FFT(DemodSym, FFTLen))
    [ĥ₁, ..., ĥₙ] = LeastSquares([f̂₁, ..., f̂ₙ])
    [f̃₁, ..., f̃ₙ] = arg min_(f₁∈(f̂₁−Δ,f̂₁+Δ),...,fₙ∈(f̂ₙ−Δ,f̂ₙ+Δ)) R([ĥ₁, ..., f̂ₙ])
    SymCount = SymCount + 1
end while
```

(51) Int. Cl.
*H04L 27/10* (2006.01)
*H04L 25/02* (2006.01)
*H04L 27/26* (2006.01)
*H04L 27/144* (2006.01)

(52) U.S. Cl.
CPC .......... *H04L 27/144* (2013.01); *H04L 27/265* (2013.01); *H04W 52/0209* (2013.01); *H04B 2001/6912* (2013.01)

(56) References Cited

U.S. PATENT DOCUMENTS

| | | |
|---|---|---|
| 2014/0064337 A1* | 3/2014 | Hiscock ................ H04B 1/69 375/139 |
| 2016/0226654 A1* | 8/2016 | Sinibaldi ............. H04L 27/2665 |
| 2016/0277747 A1 | 9/2016 | Schaffner et al. |
| 2017/0324442 A1* | 11/2017 | Casagrande ........ H04L 27/1566 |
| 2020/0304169 A1* | 9/2020 | Dongare ............. H04L 27/3818 |
| 2021/0111750 A1* | 4/2021 | Nguyen ................ H04B 1/69 |

OTHER PUBLICATIONS

Eletreby et al., "Empowering Low-Power Wide Area Networks in Urban Settings", Proceedings of ACM Sigcomm conference, Los Angeles, California USA, Aug. 2017. Retrieved from Internet, URL: <https://dl.acm.org/citation.cfm?doid=3098822.3098845>, Retrieved on Oct. 14, 2019, 13 pages.

* cited by examiner

Algorithm 1 Decoding collisions $PreambleLen = \ell$, $SpreadingFactor = SF$
$SymSize = 2^{SF}$
$FFTLen = 10 \times SymSize$
while $SymCount < \ell$ do
    $DemodSym = Symbols(SymCount) \ast DownChirp$
    $n = \text{NumPeaks}(FFT(DemodSym, FFTLen))$
    $[\mathring{f}_1, \ldots, \mathring{f}_n] = \text{FindPeaks}(FFT(DemodSym, FFTLen))$
    $[\mathring{h}_1, \ldots, \mathring{h}_n] = \text{LeastSquares}([\mathring{f}_1, \ldots, \mathring{f}_n])$
    $[\bar{f}_1, \ldots, \bar{f}_n] = \arg\min_{f_1 \in (\mathring{f}_1 - \Delta, \mathring{f}_1 + \Delta), \ldots, f_n \in (\mathring{f}_n - \Delta, \mathring{f}_n + \Delta)} R([\mathring{f}_1, \ldots, \mathring{f}_n])$
    $SymCount = SymCount + 1$
end while

LOW-POWER WIDE AREA NETWORKS

RELATED APPLICATIONS

This application is a national phase filing under 35 U.S.C. § 371 claiming the benefit of and priority to International Patent Application No. PCT/US2019/040470, filed on Jul. 3, 2019, which claims benefit of U.S. provisional Patent Application No. 62/763,876, filed Jul. 6, 2018 entitled "Empowering Low-Power Wide Area Networks In Urban Settings". The entire contents of these applications are incorporated herein by reference.

GOVERNMENT INTEREST

This invention was made with government support under contracts CCF1617934 and CNS1657318 awarded by the National Science Foundation. The government has certain rights in the invention.

BACKGROUND OF THE INVENTION

Low-Power Wide Area Networks (LPWANs) have recently emerged as an attractive communication platform for the Internet of Things (IoT). LP-WANs enable low-power devices (milliwatts) to transmit at low data rates (kilobits per second) over long distances (several kilometers). LP-WANs are an ideal vehicle for cheap, low-power IoT devices such as sensors that have limited power budget (e.g. a ten-year lithium ion battery), but also send only a few kilobits per second of sensed data to the cloud. Consider future smart cities where a few LP-WAN towers gather sensor data from a large number of low-power devices in the city. Such devices can exploit this reliable infrastructure to communicate, no matter where they are placed, without ever being charged during their lifetimes.

Deploying city-scale LP-WAN networks is challenging for two reasons: the density of deployment and the nature of urban environments. First, the sheer density of deployment of LP-WAN nodes means that transmissions from a large number of transmitters will often collide. Such collisions adversely impact LP-WANs, draining battery life and wasting precious air time and spectrum in a dense network. Second, deployments in urban areas cause the already weak signals of low-power nodes to be further attenuated by buildings and other obstacles before reaching the base station. This greatly reduces the range of LP-WAN sensors from over 10 km in rural areas to 1-2 km or less in urban settings.

At the root of these challenges is the limited capability of LPWAN hardware, both at the base station and at the clients. On one hand, the limited power budget and low cost of LP-WAN clients make it challenging to deploy sophisticated MAC and PHY-layer schemes to avoid collisions. On the other hand, LP-WAN base stations struggle to resolve a large number of such collisions. Indeed, state-of-the-art techniques such as uplink MU-MIMO can, at best, separate as many sensor nodes as there are base station antennas (typically 3-4 due to limits on the size and cost). As a result, there remains a fundamental disconnect between the vision of dense, city-wide LP-WANs and the capabilities of state-of-the-art LP-WAN hardware.

SUMMARY OF THE INVENTION

Described herein is a solution to overcome the challenges of dense, city-scale LP-WANs despite the limited capability of client sensor nodes and base stations. In a first aspect of the invention, the problem of collided transmissions from dense deployments of LP-WAN clients at an LP-WAN base station is resolved, even if the base station is not MIMO (multi-in, multi-out) capable. This innovation improves the throughput, latency and battery life of LP-WAN nodes.

In a second aspect of the invention, the range of teams of low-power LP-WAN sensors in urban environments is improved. Teams of co-located sensors can communicate together with an LP-WAN base station, even if they are individually beyond its reception range.

The invention is fully implemented at the LP-WAN base station without requiring hardware modifications to LP-WAN sensors.

To disentangle collisions at the base station, a strategy that exploits hardware imperfections of low-cost components in LP-WAN radios is used. Specifically, the signals transmitted by such hardware produces offsets in time, frequency, and phase. The invention includes algorithms that use these offsets to separate and decode collisions from transmitters. It achieves this by leveraging properties of the physical layer of LoRaWAN LP-WAN radios that transmits signals in the form of chirps, i.e., signals whose frequency varies linearly in time. In digital communications, chirp spread spectrum (CSS) is a spread spectrum technique that uses wideband linear frequency modulated chirp pulses to encode information. An "up-chirp" is a signal whose frequency increases over time, while a "down-chip" is a signal whose frequency decreases over time. Hardware offsets, whether in time, frequency or phase, manifest as distinct aggregate frequency shifts in chirps from each transmitter. The received signal is filtered using these shifts to separate signals from different transmitters.

The invention also overcomes multiple challenges to decode useful data packets from each filtered signal component. First, novel algorithms to separate bits of data from hardware offsets are provided, both of which are embedded in frequency shifts of chirps. Second, the invention uses the precise values of the offsets of the separated signals to identify which bits of decoded data belongs to which client to reconstruct the packets over time.

Sensors are disentangled in the lime and frequency domain as opposed to the antenna domain (i.e., MIMO). As such, the invention can be implemented on a single-antenna base station. The throughput of dense urban LP-WANs is thereby improved by decoding transmissions from multiple nodes simultaneously with minimal coordination overhead. Further both latency and battery life of LP-WAN clients are enhanced by removing the need for retransmissions.

Hardware offsets between transmissions can also be used to boost the range of LP-WANs. Transmissions from teams of LP-WAN sensors may be individually beyond the range of the base stations but are physically co-located. Such sensors are likely to record similar readings, resulting in overlapping values for the most-significant bits of sensed data. In this aspect of the invention, a mechanism has been devised for such overlapping most-significant bits to be recovered to help obtain a coarse view of sensed data in a given area.

A simple modification of the LP-WAN PHY allows overlapping chunks of bits collected by sensor nodes to be transmitted concurrently as overlapping chunks of signals that are received at higher aggregate power. A novel algorithm is specified to achieve this in software without requiring expensive hardware modifications at the LP-WAN clients to tightly synchronize their transmissions.

DETAILED DESCRIPTION

Before providing the details of the invention, a brief overview on the LoRaWAN LP-WAN protocol may be useful. LoRaWANs operate in the unlicensed 900 MHz band with bandwidths of up to 500 kHz. LoRaWAN base stations transmit at powers up to 1 Watt while clients transmit few milliwatts at best. The PHY and MAC layers are designed with this power asymmetry in mind.

Figure 1:
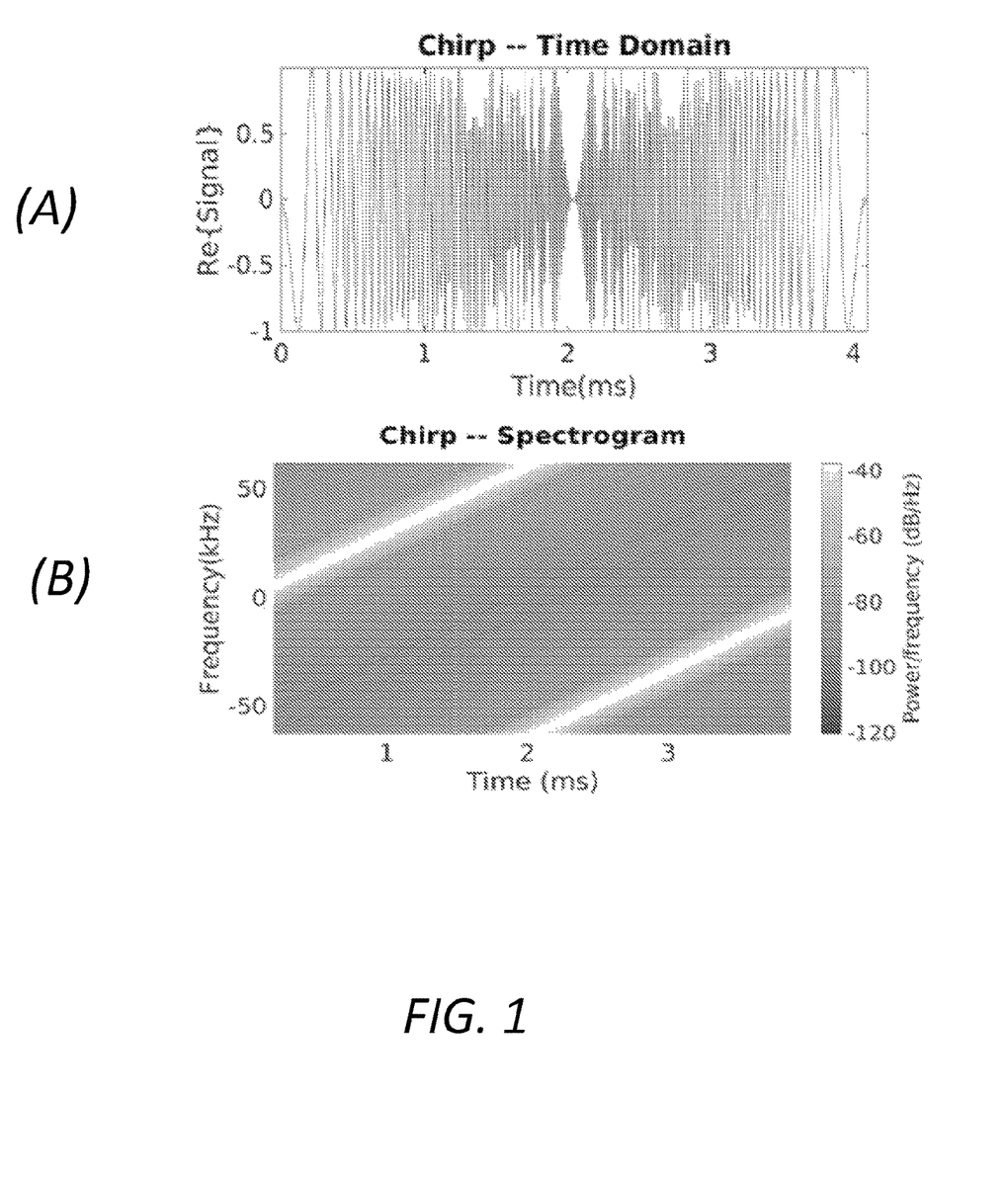
FIG. 1 illustrates a "chirp" from a LP-WAN physical layer depicting a "0" bit, with View (A) showing the time domain and View (B) showing the corresponding spectrogram.
Figure 2:
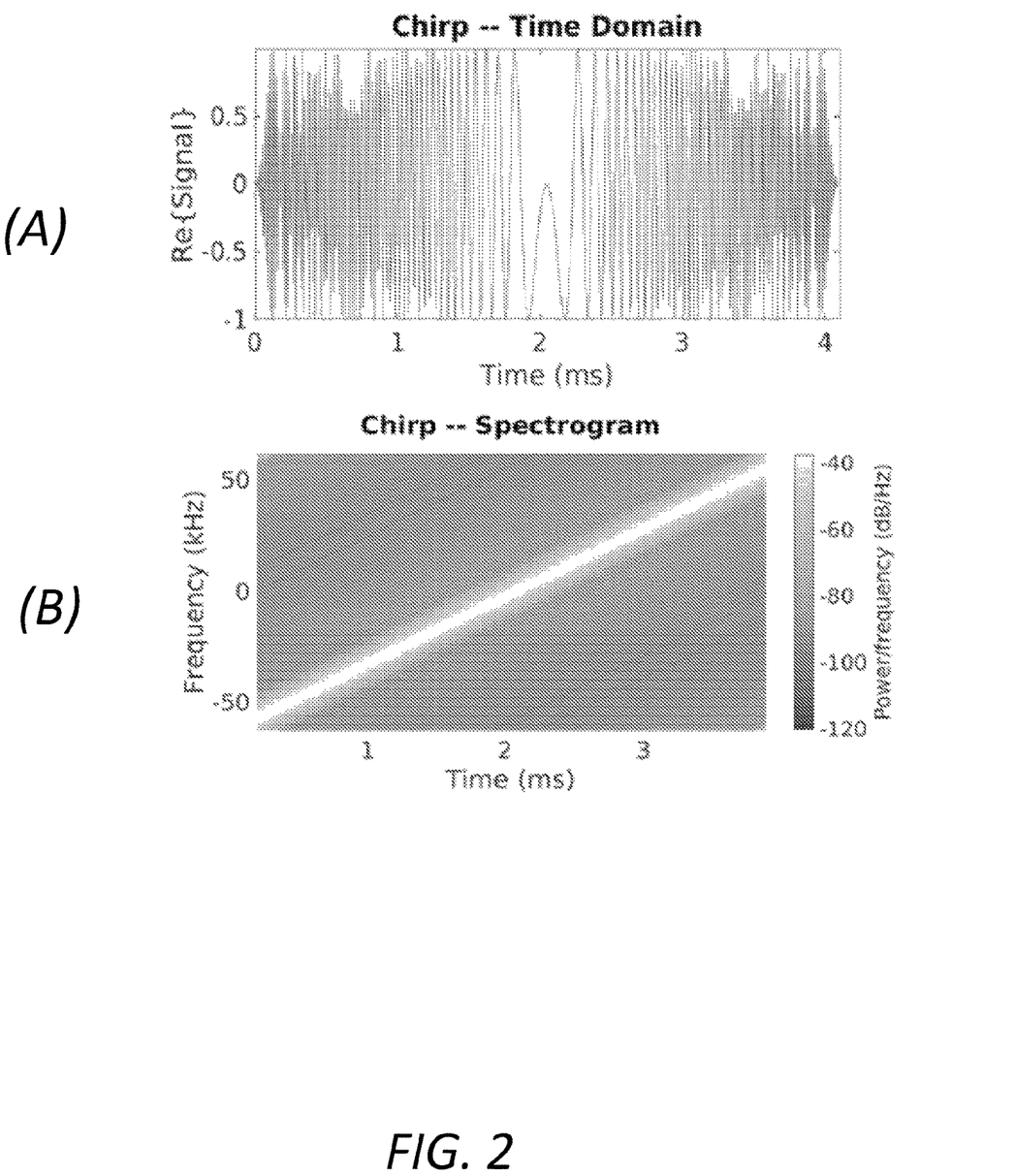
FIG. 2 illustrates a "chirp" from a LP-WAN physical layer depicting a "1" bit, with View (A) showing the time domain and View (B) showing the corresponding spectrogram.

The LP-WAN PHY encodes information in the form of multiple "chirps" that are signals whose frequency varies linearly in time over the available bandwidth. FIGS. 1 and 2 illustrate two such chirps depicting bits "0" and "1", with View (A) of each figure showing the respective chirp in the time domain View (B) of each figure showing the corresponding spectrogram. Different bits are encoded by initiating the chirps at different frequencies, for instance "0" at −62.5 kHz and "1" at 0 kHz over a bandwidth of 125 kHz.

LoRaWAN uses chirps, as they occupy limited instantaneous bandwidth and therefore consume very little power in communicating bits over long distances. Further, they are robust to narrowband interferers.

Rate Adaptation: While FIGS. 1 and 2 depict the encoding of one bit per chirp, LoRaWAN supports larger data rates by increasing the number of possible starting frequencies of a chirp to pack in more bits. For instance, a transmission with 3-bits per chirp would choose from one of $2^3=8$ possible starting frequencies. The LoRaWAN standard allows as many as 12-bits encoded in a chirp. LoRaWAN base stations program each client to operate on a suitable data rate based on its received signal-quality.

MAC Layer: The LoRaWAN MAC is designed to avoid collisions and divide air time between competing transmitters. LoRaWAN typically employs two modes to do this for low-power nodes: (1) An Aloha MAC that allows nodes to transmit as soon as they wake up and apply random exponential back-off, when faced with a collision. While simple, Aloha scales poorly in dense networks due to frequent collisions; and (2) A TDMA scheduler where the base station allots predetermined slots to clients. The choice of scheme depends on the application (e.g. whether sensed data is bursty) and client power constraints.

Algorithm Overview

A brief overview of the core algorithm of the present invention will now be discussed. At a high level, the goal is to disentangle wireless signal measurements from colliding LP-WAN transmitters with a single-antenna LP-WAN base station. The core concepts are best understood with an example. Consider two LP-WAN radios, both transmitting the same sequence of n bits to an LP-WAN base station. Assume that the n bits are encoded in a single chirp as in FIGS. 1 and 2 by each transmitter. If the two transmissions are aligned perfectly in time, a collision between their chirps will result. Given that the two LP-WAN radios encode their bits in the exact same way, the resulting chirps would be identical. At first blush, one would assume that these chirps would combine either constructively or destructively upon colliding. This would be problematic for two reasons: First, the combined signal would be indistinguishable from a single transmitter with higher power, rendering the two chirps from the two transmitters impossible to be separated. Second, if the signals add up destructively, one would not be able to recover either of their transmissions.

Figure 3:
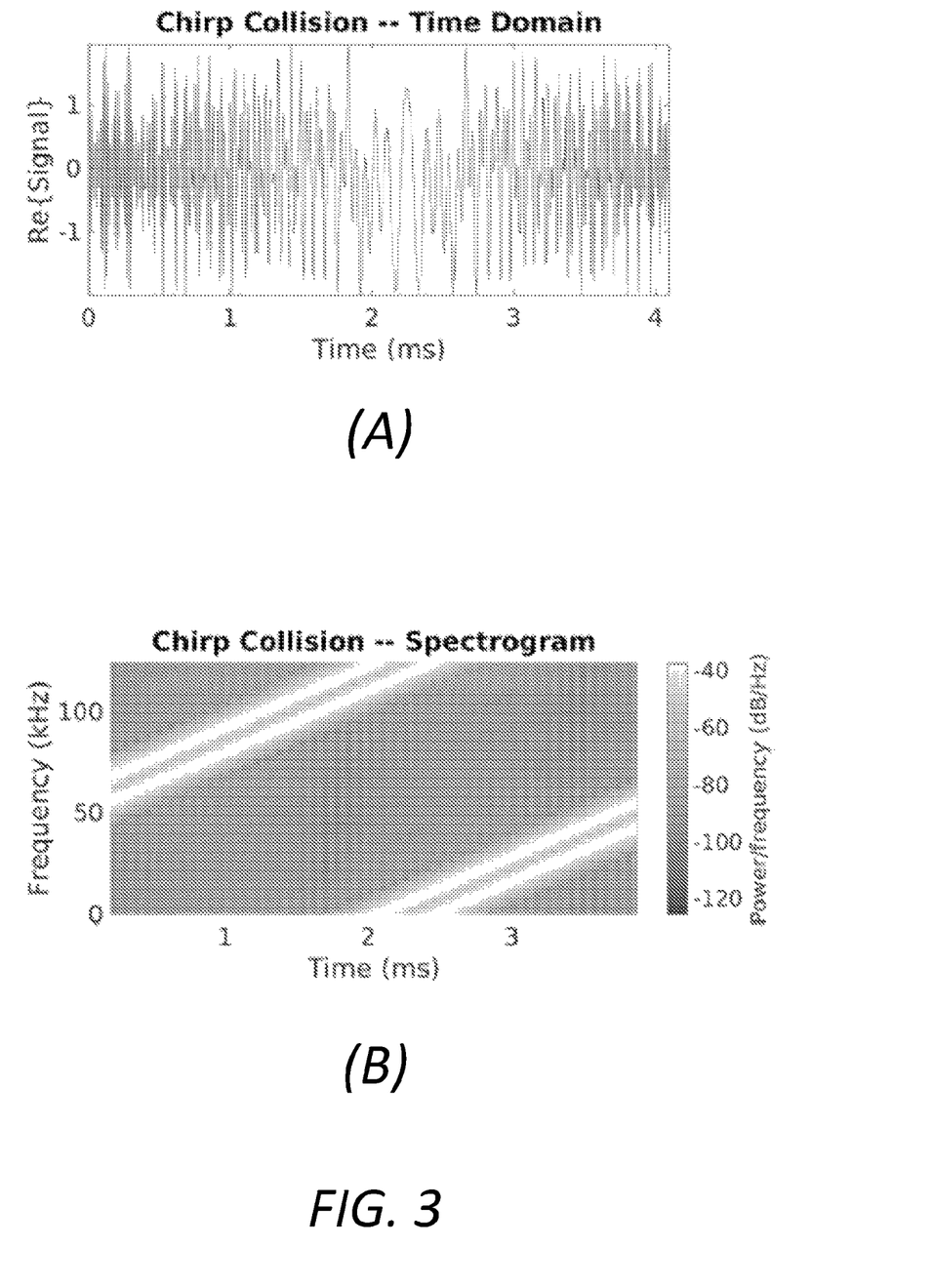
FIG. 3 shows the spectrogram of two collided chirps from two LP-WAN radios

The present invention recognizes that in practice, however, the two signals can be separated by exploiting the natural hardware imperfections of the two radios. Specifically, signals from the two transmitters are likely to experience a small frequency offset, due to a difference in the frequency of their oscillators. This would result in the two chirps being slightly offset in frequency. View (A) of FIG. 3 depicts a chip collision in the time domain. View (B) of FIG. 3 depicts the spectrogram of two collided chirps from two off-the-shelf LP-WAN radios gathered by a software radio. Note that one can observe two distinct chirps that are shifted in frequency, despite the fact that they both convey the same information. At this point, the two chirps can be separated using a simple process: (1) The received signal is multiplied by a down-chirp that would result in two tones at two frequencies. (2) Fourier transform of size $2^n$ is applied, which results in two peaks corresponding to the two transmissions. The down-chirp is the complex conjugate of the corresponding up-chirp that was used for CSS modulation. In View (C) of FIG. 3, two peaks at two distinct bins can be observed, corresponding to the two transmissions. This process can then be repeated for subsequent received chirps to disentangle transmissions from the two transmitters.

While the above approach succeeds in separating the two transmitters, it fails to decode useful data. To see why, recall that LoRaWAN encodes data by shifting chirps in frequency. Specifically, n bits are encoded as $2^n$ distinct chirps, each starting at a unique frequency. Consequently, the location of the peak corresponding to each transmitter is given by the sum of this frequency offset and the underlying data transmitted. To illustrate the problem, observe that View (C) of FIG. 3, shows two peaks at bins 207 and 257.

Such a collision could both be interpreted as identical data and a frequency offset of 50 bins, or zero frequency offset and encoded data differing by 50 bins, or any of the many options in between. The present invention overcomes this problem by relying on the fact that, while frequency offset remains constant over a packet between chirps, data does not. To see how this is useful, consider two packets consisting of three symbols (i.e., three chirps) that collide from two transmitters. Assume that the first symbol is a known preamble shared by all transmitters, while the second and third carry useful data. As a result, peak locations from the first symbol can be used to estimate the frequency offset of the first and second transmitters respectively. These frequency offsets can now be subtracted from peaks in subsequent transmissions to capture data corresponding to the first and second transmitter respectively.

It is important to be able to discern the first and second transmitters in each data symbol. Knowing this is necessary to map the correct frequency offset to the correct peak. More importantly, it is required to avoid mixing up the data bits of the two transmitters when reporting the decoded data. The solution to resolve this challenge relies on the fact that data bits occur on integer peak locations in the Fourier transform, while frequency offsets need not. Put differently, frequency offset is a physical phenomenon and does not need to be a perfect multiple of the size of a Fourier transform bin. As a result, the peak locations can be an arbitrary fraction of a Fourier transform bin.

To illustrate, suppose two data symbols are observed where the peaks are at 207.2, 257.6 for the first symbol and 81.6, 200.2 for the second symbol. While the integer parts of these peak locations depend on both data and frequency offset, the fractional part depends only on frequency offset, which remains consistent across symbols. Consequently, 207.2 and 200.2 must map to one transmitter while 257.6 and 81.6 belong to the other. The fractional part of peak locations can be used to distinguish between peaks corresponding to the different transmitters in each symbol, prior to decoding their data bits.

To realize the above objective described above, three important objectives must be met: (1) Separating multiple transmitters; (2) Tracking transmitters using time and frequency offsets; and (3) Exploiting correlated data.

Separating Multiple Transmitters

The frequency offsets must be estimated accurately to within a fraction of each bin of the Fourier transform. In doing so, leakage between peaks that is produced due to the frequency offsets that are non-integer multiples of a Fourier transform bin must be accounted for and actively leveraged. These frequency offsets can be used to separate collisions of multiple transmitters.

As explained earlier, the approach of the present invention relies on accurately estimating and exploiting the frequency offset of individual clients. However, estimating frequency offsets accurately in the presence of noise remains a challenge. To illustrate the need for this, consider the example shown in View (C) of FIG. 3. Signals from two transmitters manifest as two distinct peaks shifted owing to frequency offset. At this point, the locations of the peaks can be used to estimate the respective frequency offsets of the two nodes. Further, the signals around each of the two peaks can be filtered to obtain the signals from the respective transmitters.

While the above approach is simple, it is also prone to inaccuracies and vulnerable to interference. To see why, recall that the estimate of frequency offsets from peak locations is only accurate to within one Fast Fourier Transform (FFT) bin. However, frequency offset is a physical phenomenon that need not be an integer multiple of an FFT bin. This means that the above method loses any information pertaining to frequency offset that is a fraction of one FFT bin. Failing to account for fractional frequency offsets has two important implications: (1) First, the fractional part of the frequency offset is extremely useful in identifying which transmitter is which across symbols. Without this, the data corresponding to a single transmitter cannot be tracked over time. (2) Second, and more fundamental, having an inaccurate estimate of frequency offset leads to an inaccurate estimate of wireless channels and thus, of the decoded data. Specifically, it causes peaks corresponding to one transmitter to "leak" into others, causing interference. Indeed, this leakage is particularly acute when one transmitter is significantly closer to the receiver compared to the other. This causes one peak to be buried due to noise stemming from another.

The solution of the present invention to address both of these challenges to estimate frequency offsets as well as to separate and decode data, will now be described.

Measuring Accurate Frequency Offset

To accurately measure the fractional part of the frequency offset the leakage of one peak to the other can be exploited. To illustrate this with an example, revisit the scenario in FIG. 3 where the two transmitters are separated by a fractional value of frequency offset corresponding to 50.4 bins. FIG. 3, however depicts two clear peaks separated by exactly 50 bins. The remaining separation of 0.4 is encoded in the smaller peaks that leak around the surrounding bins. To better understand and analyze this leakage, a Fourier transform of the collision between the two transmitters over a wider window, for example, 10 time larger, can be performed by zero-padding the signal. View (D) of FIG. 3 plots the resulting Fourier transform output. It can be observed that there are "sinc" functions centered around each peak, a properly that stems from the Nyquist sampling theorem. It can also be observed that the smaller peaks around the main two peaks are produced due to the side-lobes of these sinc functions. Notice that these side lobes are periodic, at an interval of exactly one FFT bin. If the two main peaks were separated by an integer multiple, the zeros of the side lobes would overlap perfectly with the main peaks, ensuring zero leakage. In contrast, a fractional separation between peaks causes the side lobes of one peak to interfere with the main lobe of another peak, distorting its shape and location. Consequently, identifying the location of the maxima of the main peaks of the two sincs provides only a coarse estimate of the frequency offset.

In the above example, it can be observed that the two peaks are separated by 50.3 bins—an improvement over the previous estimate of 50 bins, but a value that is still erroneous. To obtain a more fine-grained estimate of the frequency offset, the leakage of the sinc function of one client's signal into the other can be explicitly modelled. First, the wireless channels of each transmitter are estimated, given the coarse estimate of its frequency offset. The received signal are then reconstructed using the obtained wireless channels and the frequency offsets. The reconstructed wireless signal is reconstructed from the actual one to obtain the residual signal. The power of this residual function is an estimate of the goodness of the current frequency offset estimates. The frequency offsets of the estimates are then jittered and the process is repeated until the power of the residual is minimized. The power of residuals across frequency offset values is locally convex, allowing an efficient search over the space of frequency offsets.

The approach to mathematically estimate frequency offsets from the collision of two transmitters sending an identical symbol, e.g. a preamble sequence is herein illustrated.

Let $h_1$ and $h_2$ denote the wireless channels and let $f_1$ and $f_2$ denote the frequency offsets of two transmitters whose chirps collide in time. Let C denote the chirp in the preamble transmitted by both clients that spans a bandwidth of B. The time domain representation of the collision can be represented as:

$$y(t)=h_1 e^{j2\pi f_1 t}C+h_2 e^{j2\pi f_2 t}C \Rightarrow yC^{-1}=h_1 e^{j2\pi f_1 t}+h_2 e^{j2\pi f_2 t} \quad (1)$$

where $C^{-1}$ denotes the down-chirp corresponding to the up-chirp C. Ideally, the frequency domain representation of the above signal (obtained via FFT), denoted $\mathcal{F}(yC^{-1})$, should result in two peaks at frequencies $f_1$ and $f_2$. However, in practice $f_1$ and $f_2$ are unlikely to be at integer boundaries of the FFT bin, as explained earlier. As a result, the peaks of the Fourier transform will likely be close, but not equal, to $f_1$ and $f_2$.

The observed peak locations can be denoted as $\tilde{f}_1$ and $\tilde{f}_2$ respectively. The approximate wireless channels $\tilde{h}_1$ and $\tilde{h}_2$ that best fit Eq. (1) can then be estimated. Fortunately, given that Eq. (1) is linear, this can be obtained using a least-squares closed form as:

$$[\tilde{h}_1 \tilde{h}_2] = (E^T E)^{-1} E^T y C^{-1}, \text{where } E = [e^{j2\pi \tilde{f}_1 t} e^{j2\pi \tilde{f}_2 t}] \quad (2)$$

The goodness of fit of the estimated frequency offset from the observed values can be estimated by capturing how well the above channels fit the received signal. Specifically, the difference between the received signal and the reconstructed signal based $\tilde{f}_1$, $\tilde{f}_2$ on can be measured as:

$$R(\tilde{f}_1, \tilde{f}_2) = \|yC^{-1} - (\tilde{h}_1 e^{j2\pi \tilde{f}_1 t} + \tilde{h}_2 e^{j2\pi \tilde{f}_2 t})\|^2 \quad (3)$$

Figure 4:
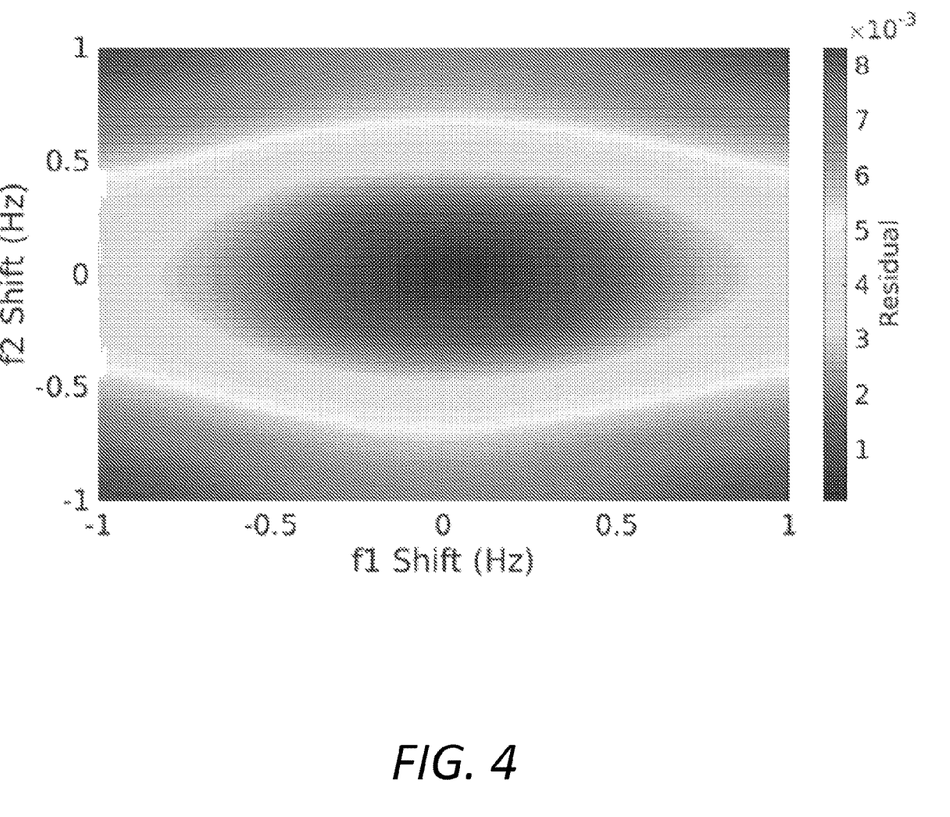
FIG. 4 shows a residual function, which depicts the residual frequency for a representative trace with two colliding transmitters as a locally convex function.

Clearly, from Eq. (1) and Eq. (3), the residual $R(\tilde{f}_1, \tilde{f}_2)$ will be minimized when $\tilde{f}_1 = f_1$ and $\tilde{f}_2 = f_2$. The solution therefore re-estimates the above residual for frequency offsets in the neighborhood of $\tilde{f}_1$ and $\tilde{f}_2$ and identifies the offsets at which the residual is minimized. Namely, the updated frequency offsets $\hat{f}_1$ and $\hat{f}_2$ are computed via:

$$(\hat{f}_1, \hat{f}_2) = \arg \min_{(f_1 \in (\tilde{f}_1 - \Delta, \tilde{f}_1 + \Delta), f_2 \in (\tilde{f}_2 - \Delta, \tilde{f}_2 + \Delta))} R(f_1, f_2) \quad (4)$$

where $\Delta$ is the bin-size of the FFT. Repealing the above steps exhaustively over all frequency offsets can be computationally expensive. However, in practice, the residual function $R(\tilde{f}_1, \tilde{f}_2)$ is locally convex, allowing for more efficient search strategies. Intuitively, the local convexity stems from the fact that wireless channels themselves are physical phenomena and therefore tend to be continuous and differentiable. To illustrate, FIG. 4 shows a plot of a representative example of the residual function for a collision of two LoRaWAN transmitters.

Figure 5:
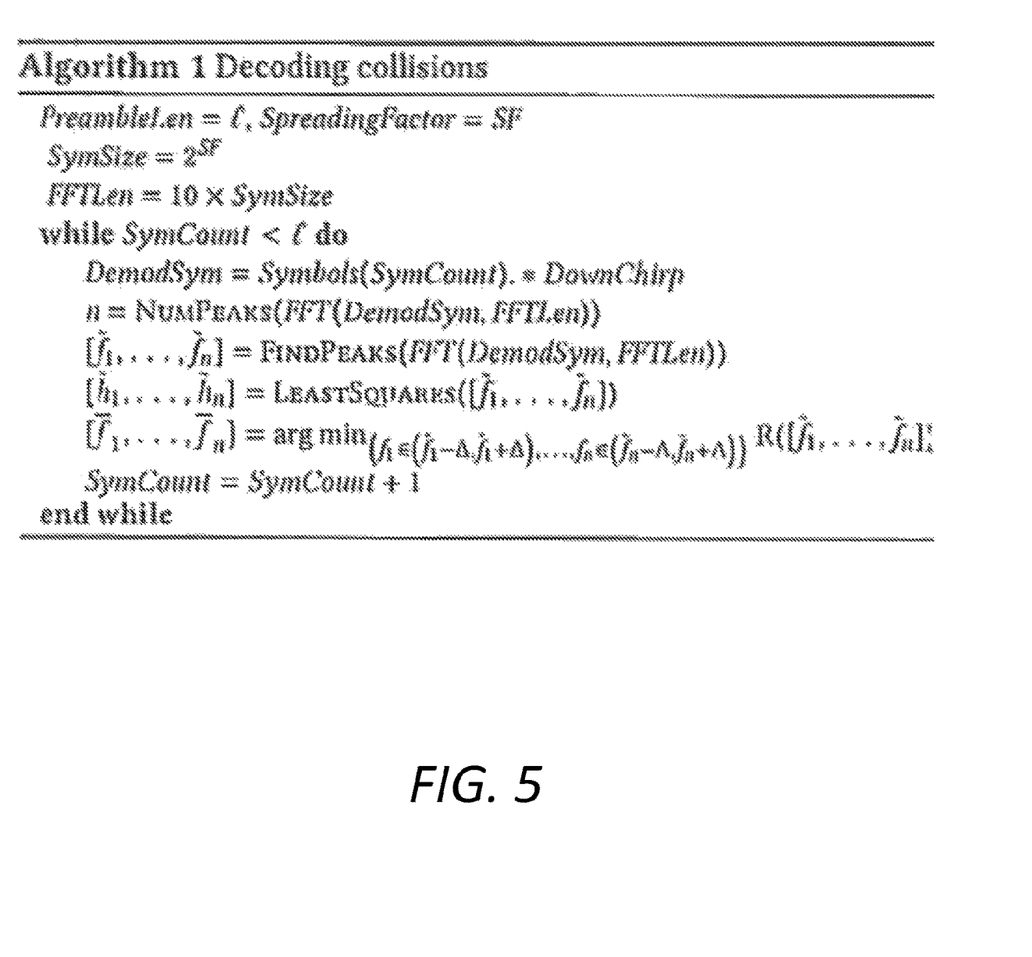
FIG. 5 shows the decoding collisions algorithm of the present invention.

This allows the application of stochastic gradient-descent algorithms on the residual function with randomly chosen initial points that are likely to converge to the global minimum. Algorithm 1, shown in FIG. 5, provides the pseudo-code of the approach of the present invention.

While the discussion above focuses on two colliding transmitters, it can be readily generalized for multiple collisions.

Accounting for the Near-Far Effect

While the previous discussion assumes that one can obtain a coarse estimate of the frequency offset by detecting peaks in the Fourier transform, this is often not the case. Consider teams of colliding client transmitters where some are physically closer to the base station compared to others. The nearby transmitters will have clear peaks that are readily discernible from the Fourier transform. The further away transmitters, however, may have significantly weaker peaks that are comparable to the side-lobes of the nearby transmitters. It is quite possible that transmissions from further away transmitters are missed altogether. This is essentially a near-far problem where strong receptions from nearby transmitters overwhelm weaker transmitters.

The approach disclosed above to model and eliminate leakage eliminates interference between transmitters but is susceptible to missing weak clients altogether. To strike a balance between modeling leakage and recovering weak clients to get the best of both worlds, the present invention relies on the fact that while interference from strong transmitters to weaker ones (and to each other) is likely to be high, the opposite is unlikely to be true. This leads to the application of successive interference cancellation in phases, as opposed to one transmitter at a time. Specifically, the approach first measures frequency offset and channels of all the strong transmitters whose peaks are discernible simultaneously. The signals of these transmitters are then subtracted from the received signal to eliminate interference to any weaker clients whose peaks were overwhelmed by these transmitters.

This approach, like traditional outdoor networks, is always limited by the resolution of the analog-to-digital converter. As a result, extremely weak transmitters are likely to be missed if they are not registered by the analog components.

Decoding Data from Collisions

It should be noted that, once the wireless channels and frequency offsets are estimated, decoding data is extremely simple. Specifically, consider collisions of two transmitters synchronized in time whose data as well as preamble symbols collide. The peak locations are first estimated, i.e. frequency offsets $\hat{f}_1$ and $\hat{f}_2$ averaged across each symbol of the preamble. This process is then repeated for the data symbol. where peak locations arc given by $d_1 + \hat{f}_1$ and $d_2 + \hat{f}_2$, a sum of both the frequency offsets and the data ($d_1$, $d_2$). The known frequency offset can then be subtracted from these values to obtain the data. Further, one can use the fractional part of the frequency offset to infer which of these data bits maps to which transmitter across symbols.

The present invention relies on frequency offsets of LP-WAN radios to remain stable within a packet (~10 ms) but diverse across clients, owing to hardware differences.

Tracking Transmitters Using Time and Frequency Offsets

Up to this point, it has been assumed that signals collide in a perfectly synchronized manner in time. In practice, however, collisions can occur with arbitrary timing offsets. This can be overcome by exploiting the duality between time and frequency in chirps: an offset In time manifests as an equivalent offset in frequency.

In this section, the approach of the present invention to estimate and actively exploit the natural timing offsets between transmissions is described. Timing and frequency offset estimates, along with wireless channels, are used to map which bits belong to which transmitters within a packet.

Exploiting Timing Offsets

Timing offsets are exploited by leveraging the properties of the chirp spread spectrum used by LoRaWAN radios. In particular, the fact that chirps, by definition, are signals whose frequency increases linearly with time is useful. This means that any offset in time of a received signal chirp can be equivalently interpreted as a corresponding offset in frequency. Given that the approach of the present invention corrects for and exploits frequency offsets, it remains immune to timing offsets as well.

To demonstrate why this is the case, consider chirps (symbols) from two different clients that collide in time. Assume the two symbols in Eq. (1) are off by a shift in time of $\Delta t_1$ and $\Delta t_2$, respectively. Then, a shift in time of $\Delta t$ is akin to a shift in frequency of $B\Delta t/T$. This means that, in the presence of frequency offset, the received wireless signal can be re-written as:

$$y(t) = h_1 e^{j2\pi\left(f_1 + B\frac{\Delta t_1}{T}\right)t} C + h_2 e^{j2\pi\left(f_2 + B\frac{\Delta t_2}{T}\right)t} C \quad (5)$$

In other words, the timing offset is simply absorbed into the frequency offset estimates previously discussed. More importantly, the timing offset between any two transmitters, just like the frequency offset, remains consistent across symbols over the duration of a packet.

Dealing with Inter-Symbol Interference

Figure 6:
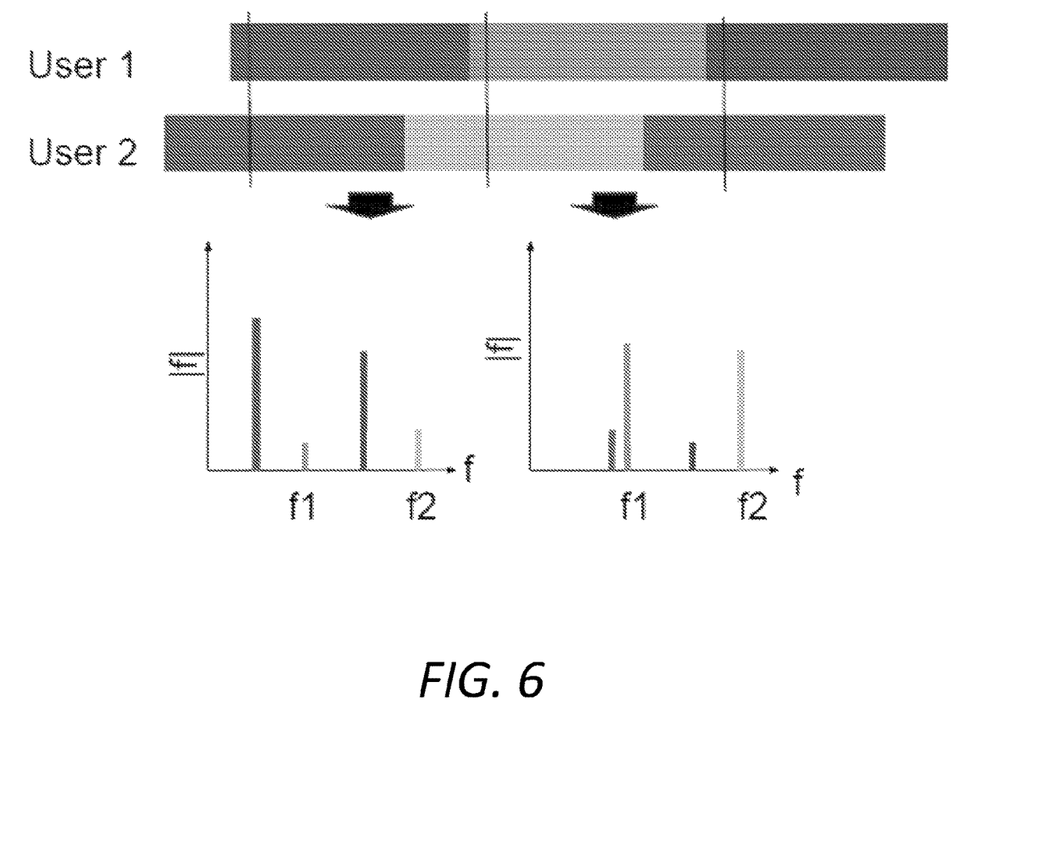
FIG. 6 shows inter-symbol interference as a spectrogram of two collided chirps and the corresponding Fourier transform peaks.

While the approach described above accurately accounts for timing offset within a symbol, it fails to capture the effect of inter-symbol interference. To illustrate, consider FIG. 6 showing where transmissions of two transmitters collide, each sending different data symbols and each encoded by a chirp. In this case, it is quite possible that over the duration T of a chirp, one can observe as many as four distinct symbols colliding as shown. Failure to account for these collisions would lead to access points dropping or re-ordering symbols between transmitters.

The solution of the present invention to account for inter-symbol interference explicitly tracks the peaks that result from this interference. Specifically, a collision of two shifted symbols produces at most four peaks in the Fourier Transform—two belonging to the first client and two to the second. FIG. 6 shows such a Fourier transform for two adjacent time windows, each of length T The locations of these peaks can then be extracted to obtain four distinct data values per time window. However, given that two symbols participate in both the first and second collision, the two collisions are guaranteed to share two common data values, as shown in FIG. 6. Any pair of adjacent collisions will share at least two common data values. By ensuring that any such common values are reported only once (for example, the first time they appear), half of the observed peaks can be eliminated. This enables the data from all transmitters to be correctly reported in-sequence, despite inter-symbol interference.

Mapping Symbols to Transmitters within a Packet

Both time and frequency offsets may be used to map which symbols (i.e., chirps) correspond to which transmitter within a packet along with one other metric-wireless channels. Like hardware offsets, wireless channels are expected to remain consistent for a given client over a packet and vary between clients. For instance, in FIG. 6, it can be seen that peaks of the same transmitter over two symbols are not only identical in frequency offset, but also in relative height. This means that channel magnitude and phase, after correcting for any phase offsets between symbols introduced by frequency offsets, serves as a feature to identify transmitters. This allows the building of a semi-supervised clustering model using the fractional part of peak location, channel magnitude, and phase. The clustering algorithm is given known prior relationships, e.g. multiple peaks in the same symbol map to distinct transmitters. The clustering algorithm can then be run to recover the sequence of bits corresponding to each transmitter.

Exploiting Correlated Data

The discussion above has thus far been focused on decoding uncorrelated data bits transmitted by two transmitters. However, sensor data is often correlated resulting in nodes transmitting identical chunks of bits.

So far, the present invention has been applied to disentangle and decode colliding transmissions from clients who arc all within communication range of the base station. However, the approach also provides a unique opportunity to retrieve data from clients beyond communication range. The data transmitted by an LP-WAN sensor cannot be decoded by the base station if the received SINR falls below a particular threshold. Indeed, a message modulated by CSS can be recovered even if it is deeply buried in noise, but there is a particular minimum SINR below which a transmitted message will not even be detected by the base station.

Although one would expect that all LP-WAN sensors were initially deployed in the vicinity of an LP-WAN base station (and thus should always be reachable), their transmissions may not reach the base station because of the randomness of the wireless channel, interference with other technologies sharing the same bandwidth, or a change in the surrounding urban environment itself.

While individual sensors may be beyond communication range, collisions of teams of such sensors can be detected by base stations. These collisions can be decoded to recover bits transmitted by these sensors that overlap. Indeed, given that sensors geographically close to one another are likely to have several overlapping bits, one can use this information to obtain a coarse view of sensor data in a given geographical region.

Coordinating Transmissions from Sensor Teams

Consider a team of sensors that are individually beyond communication range but would like to transmit identical data packets. Indeed, gathering a large team of sensors would cause the overall received power to add up, increasing signal power. However, to do so one would have to ensure that the transmissions are synchronized in time so that identical symbols across transmitters add up to reinforce received power.

Time Synchronization

The present invention is immune to timing offset. Specifically, the base station must transmit a beacon packet that solicits a response from all clients in a given geographic boundary. Given that the base station affords a much higher transmit power (and superior antennas) as compared to the clients, its signal will be received by all clients, even if their signals are individually too weak to reach the base station. The clients then respond concurrently with packets in the next time slot (i.e. after a fixed pre-agreed duration of time). However, in practice, such synchronization is never perfect and packets between different clients will continue to have a small timing offset.

Fortunately, given the relatively long symbol durations of LP-WAN (~10 ms), this timing offset is smaller than one symbol. Such timing offsets can be interpreted as a corresponding frequency offset between the different transmitters. Recall that the present invention exploits such frequency offsets to obtain distinct peaks corresponding to each client in any collision. As a result, the coarse time-synchronization provided by the base station's beacon packet is sufficient to observe such peaks, at least for clients above the noise-floor at the base station.

Now that a mechanism to coordinate clients has been specified, how is it decided with whom to coordinate or schedule at any given time. In practice, making this decision is a function of the spatial distribution of client data, which can vary between different kinds of sensors and different environments. Given that clients are often deployed statically in buildings over long durations, one can learn the extent of these correlations over time. Indeed, such a scheduling algorithm can estimate the signal-to-noise ratio of clients to schedule larger groups of sensors for transmitters that are further away. In effect, this leads to a system whose resolution of measured sensor data increases for sensors that are geographically closer to the base station.

Decoding Beyond Communication Range

Now that collisions from a desired group of clients have been synchronized, their date must be detected and decoded.

Detecting Packets: A key challenge is that for transmitters far away from the base station, all peaks may be buried below the noise-floor. Indeed, this makes detecting collided packets from teams of weak client transmitters particularly challenging. The solution of the present invention to overcome this problem relies on the multiplicity of clients that collide as well as preamble symbols. In particular, the power of the Fourier representation is coherently added, given by Eq. (1) over sliding windows of 11 symbols, where 11 is the size of the preamble. Despite the fact that peaks in any one symbol are below the noise, they are unlikely to be buried in noise when averaged over a large number of symbols. This allows the detection of the packet as well as the obtaining of coarse estimates of frequency offsets as required by Algorithm 1.

Decoding Algorithm: While averaging over symbols is useful to detect the energy of the preamble, one cannot do so for the data given that each data symbol carries a unique sequence of bits. Therefore, the solution of the present invention to decode data relies on a maximum-likelihood approach that exploits the knowledge of frequency offsets. Specifically, different possible collisions of the transmitters are reconstructed given their channels and frequency offsets (from Algorithm 1) for each possible sequence of data bits in a symbol. The data bits are then obtained by identifying the collision that best fits the observed data symbol. Mathematically, for any received signal y, channels $h_i$, timing offsets $t_i$ and frequency offsets $f_i$ for each client i, the data symbol d can be obtained as:

$$d = \arg\min_{d} \left\| y - \sum_i h_i e^{j2\pi\left(f_i + B\frac{\Delta t_i}{T} + d\right)t} C \right\|^2 \quad (6)$$

where C is the known preamble chirp that spans a bandwidth B over time T, as before. Given that the above equation models and exploits the presence of multiple clients in the collision, it provides a robust method to decode data despite each individual client's signal being below noise.

Dealing with Collisions: Despite scheduling certain teams of transmitters with a beacon from the base station, it is possible that such transmissions will experience collisions with other sensors closer to the base station. The approach of the present invention to deal with such unwarranted collisions is very similar to the solution for the near-far effect, discussed above. In particular, peaks above the noise are measured and subtracted from the received signal repeatedly using Algorithm 1 until no clear peaks are visible. The detection and decoding steps described above are applied to extract scheduled transmissions from clients that are below the noise floor.

A few points are worth noting: (1) the methods of the present invention may be unable to recover collisions owing to excessive interference or noise leading to some packets unacknowledged. In this scenario, the present invention relies on LoRaWAN's underlying MAC protocol (ALOHA or TDMA) to identify such loses (e.g. using acknowledgments) and to re-transmit. (2) To achieve gains, the present invention requires that overlapping chunks of bits of sensor data lead to overlapping chunks of signals that then add up in power. However, interleaving and coding schemes may cause even data different by one bit to have few coded bits in common. The solution to resolve this is to splice sensed data into smaller packets that carry different chunks of consecutive sensed bits so that those with most significant bits remain identical, even after coding.

The methods of the present invention comprise a system that improves throughput and range of low-power wide area networks in urban environments. The novel approach exploits the natural hardware offsets between low-power nodes to disentangle collisions from several LP-WAN transmitters using a single-antenna LP-WAN base station. Further, the present invention allows teams of LP-WAN sensor nodes with correlated data to reach the base station, despite being individually beyond communication range.

The invention can be implemented as a method, as an apparatus or system including a processor, a radio transceiver, and software, for execution by the process to implement the method or as a non-transitory, computer-readable storage medium that could be provided as a firmware upgrade to existing LP-WANs.

We claim:

1. A method comprising:
   receiving, at a low-power wide-area network base receiver, two or more signals from two or more transmitters, each of the two or more signals encoding information as initial frequencies of two or more up-chirps;
   separating the up-chirps of the two or more signals to two or more frequency domain peaks;
   identifying a frequency offset corresponding to the each of the two or more frequency domain peaks; and
   subtracting each of the frequency offsets from their corresponding frequency domain peaks to retrieve data encoded in the initial frequency of each up-chirp.

2. The method of claim 1 wherein the frequency offsets are identified in a first up-chirp receive in each signal, further comprising:
   determining that subsequent chirps having a same frequency offset as the first up-chirp originated from a same transmitter as the first up-chirp.

3. The method of claim 2 wherein the separating step further comprises:
   multiplying each up-chirp by a corresponding down-chirp, resulting in two tones at separate frequencies; and
   applying a Fourier transform to the two resulting tones.

4. The method of claim 3 wherein a size of the Fourier transform is a multiple of $2^n$, where n is the number of up-chirps in the received signals.

5. The method of claim 1 wherein identifying the frequency offset for each transmitter further comprises:
   estimating the frequency offset for said transmitter;
   estimating a wireless channel for said transmitter based on the estimate of the frequency offset for said transmitter;
   re-constructing the received signal from said transmitter using the estimated wireless channel and the estimated frequency offset for said transmitter;
   subtracting the re-constructed signal from the received signal, resulting in a residual signal; and
   adjusting the estimated frequency offset and repeating the above steps until power of the residual signal is minimized.

6. The method of claim 5 further comprising:
   identifying strong transmitters as transmitters having simultaneously discernable peak frequencies;
   subtracting signals of the strong transmitters from the received signal; and
   identifying any remaining signal as originating from one or more weak transmitters.

7. The method of claim 1 further comprising:
transmitting a beacon signal requesting a response from multiple transmitters at a pre-agreed time after the multiple transmitters have received the beacon signal;
receiving concurrent signals from one or more of the multiple transmitters at the pre-agreed time;
averaging power of the Fourier representation over a plurality of observed symbols from a preamble chirp of each of the received concurrent signals;
identifying frequency offsets for the concurrent signals based on the average power;
reconstructing different possible collisions of the concurrent signals based on the frequency offsets for each possible sequence of data bits in the observed symbols from each of the received concurrent signals; and
identifying a collision of the possible collisions that best fits the observed symbols.

8. A non-transitory, computer-readable storage medium storing software that, when executed by a processor, performs the functions of:
receiving two or more signals from two or more transmitters, each of the two or more signals encoding information as initial frequencies of two or more up-chirps;
separating the up-chirps of the two or more signals to two or more frequency domain peaks;
identifying a frequency offset corresponding to the each of the two or more frequency domain peaks; and
subtracting each of the frequency offsets from their corresponding frequency domain peaks to retrieve data encoded in the initial frequency of each up-chirp.

9. The medium of claim 8 wherein the frequency offsets are identified in a first up-chirp receive in each signal, the software performing the further function of:
determining that subsequent chirps having a same frequency offset as the first up-chirp originated from a same transmitter as the first up-chirp.

10. The medium of claim 9 wherein the software performs the separating step by performing the further functions of:
multiplying each up-chirp by a corresponding down-chirp, resulting in two tones at separate frequencies; and
applying a Fourier transform to the two resulting tones.

11. The medium of claim 10 wherein a size of the Fourier transform is a multiple of $2^n$, where n is the number of up-chirps in the received signals.

12. The medium of claim 8 wherein identifying the frequency offset for each transmitter further comprises:
estimating the frequency offset for said transmitter;
estimating a wireless channel for said transmitter based on the estimate of the frequency offset for said transmitter;
re-constructing the received signal from said transmitter using the estimated wireless channel and the estimated frequency offset for said transmitter;
subtracting the re-constructed signal from the received signal, resulting in a residual signal; and
adjusting the estimated frequency offset and repeating the above steps until power of the residual signal is minimized.

13. The medium of claim 12, the software performing the further function of:
identifying strong transmitters as transmitters having simultaneously discernable peak frequencies;
subtracting signals of the strong transmitters from the received signal; and
identifying any remaining signal as originating from one or more weak transmitters.

14. The medium of claim 8, the software performing the further function of:
transmitting a beacon signal requesting a response from multiple transmitters at a pre-agreed time after the multiple transmitters have received the beacon signal;
receiving concurrent signals from one or more of the multiple transmitters at the pre-agreed time;
averaging power of the Fourier representation over a plurality of observed symbols from a preamble chirp of each of the received concurrent signals;
identifying frequency offsets for the concurrent signals based on the average power;
reconstructing different possible collisions of the concurrent signals based on the frequency offsets for each possible sequence of data bits in the observed symbols from each of the received concurrent signals; and
identifying a collision of the possible collisions that best fits the observed symbols.

15. An apparatus comprising:
a processor;
a radio transceiver; and
a non-transitory memory storing software that causes the processor to:
receive, via the radio transceiver, two or more signals from two or more transmitters, each of the two or more signals encoding information as initial frequencies of two or more up-chirps;
separate the up-chirps of the two or more signals to two or more frequency domain peaks;
identify a frequency offset corresponding to the each of the two or more frequency domain peaks; and
subtract each of the frequency offsets from their corresponding frequency domain peaks to retrieve data encoded in the initial frequency of each up-chirp.

16. The apparatus of claim 15 wherein the frequency offsets are identified in a first up-chirp receive in each signal, the software further causing the processor to:
determine that subsequent chirps having a same frequency offset as the first up-chirp originated from a same transmitter as the first up-chirp.

17. The apparatus of claim 16 wherein the software causes the processor to perform the separating step by further causing the processor to:
multiply each up-chirp by a corresponding down-chirp, resulting in two tones at separate frequencies; and
apply a Fourier transform to the two resulting tones, wherein a size of the Fourier transform is a multiple of $2^n$, where n is the number of up-chirps in the received signals.

18. The apparatus of claim 15 wherein the software causes the processor to perform the identifying step by further causing the processor to:
estimate the frequency offset for said transmitter;
estimate a wireless channel for said transmitter based on the estimate of the frequency offset for said transmitter;
re-construct the received signal from said transmitter using the estimated wireless channel and the estimated frequency offset for said transmitter;
subtract the re-constructed signal from the received signal, resulting in a residual signal; and
adjust the estimated frequency offset and repeating the above steps until power of the residual signal is minimized.

19. The apparatus of claim 15, further comprising:
identifying strong transmitters as transmitters having simultaneously discernable peak frequencies;

subtracting signals of the strong transmitters from the received signal; and identifying any remaining signal as originating from one or more weak transmitters.

20. The method of claim 15, the software further causing the processor to:

transmit a beacon signal requesting a response from multiple transmitters at a pre-agreed time after the multiple transmitters have received the beacon signal;

receive concurrent signals from one or more of the multiple transmitters at the pre-agreed time;

average power of the Fourier representation over a plurality of observed symbols from a preamble chirp of each of the received concurrent signals;

identify frequency offsets for the concurrent signals based on the average power;

reconstruct different possible collisions of the concurrent signals based on the frequency offsets for each possible sequence of data bits in the observed symbols from each of the received concurrent signals; and identify a collision of the possible collisions that best fits the observed symbols.

\* \* \* \* \*